US012462976B2

(12) United States Patent
Lim et al.

(10) Patent No.: US 12,462,976 B2
(45) Date of Patent: Nov. 4, 2025

(54) METHOD FOR MANUFACTURING RARE EARTH MAGNET

(71) Applicant: LG INNOTEK CO., LTD., Seoul (KR)

(72) Inventors: Hyun Seok Lim, Seoul (KR); Goon Seung Gong, Daegu (KR); Hyun Min Nah, Seoul (KR); Dong Hwan Kim, Daegu (KR); Won Kyu Park, Daegu (KR); Seok Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 711 days.

(21) Appl. No.: 17/297,600

(22) PCT Filed: Nov. 27, 2019

(86) PCT No.: PCT/KR2019/016464
§ 371 (c)(1),
(2) Date: May 27, 2021

(87) PCT Pub. No.: WO2020/111772
PCT Pub. Date: Jun. 4, 2020

(65) Prior Publication Data
US 2022/0028609 A1 Jan. 27, 2022

(30) Foreign Application Priority Data
Nov. 27, 2018 (KR) ........................ 10-2018-0148750

(51) Int. Cl.
*H01F 41/02* (2006.01)
*H01F 1/057* (2006.01)

(52) U.S. Cl.
CPC ....... *H01F 41/0293* (2013.01); *H01F 1/0577* (2013.01); *C22C 2202/02* (2013.01)

(58) Field of Classification Search
CPC ............................ H01F 41/0293; B22F 1/107
See application file for complete search history.

(56) References Cited

U.S. PATENT DOCUMENTS

2011/0260816 A1 10/2011 Morimoto et al.
2018/0286545 A1 10/2018 Fujikawa et al.
(Continued)

FOREIGN PATENT DOCUMENTS

JP 2011-060975 3/2011
JP 2011-223007 11/2011
(Continued)

OTHER PUBLICATIONS

Lukin, A. A., et al. "Role of terbium hydride additions in the formation of microstructure and magnetic properties of sintered Nd—Pr—Dy—Fe—B magnets." Inorganic Materials: Applied Research 4 (2013): 256-259 (Year: 2013).*
(Continued)

*Primary Examiner* — Sally A Merkling
*Assistant Examiner* — Sean P. O'Keefe
(74) *Attorney, Agent, or Firm* — KED & ASSOCIATES, LLP

(57) ABSTRACT

An embodiment discloses a method of manufacturing a rare-earth magnet, the method including: preparing a magnetic sintered body including RE, Fe, and B as compositional components (RE is selected from one or two or more selected from rare earth elements); applying a solution containing a grain boundary diffusion material to the sintered body; and performing grain boundary diffusion by heat-treating the sintered body, wherein the grain boundary diffusion material includes a heavy rare earth element (HREE) hydride and a light rare earth element (LREE) hydride.

7 Claims, 10 Drawing Sheets

(56) References Cited

U.S. PATENT DOCUMENTS

| | | | | |
|---|---|---|---|---|
| 2018/0301256 | A1* | 10/2018 | Fujikawa | C22C 38/14 |
| 2018/0301257 | A1* | 10/2018 | Fujikawa | C22C 38/005 |
| 2019/0172637 | A1 | 6/2019 | Lee | |

FOREIGN PATENT DOCUMENTS

| | | | |
|---|---|---|---|
| JP | 2012-015168 | 1/2012 | |
| JP | 2012-043968 | 3/2012 | |
| JP | 2018-164004 | 10/2018 | |
| JP | 2018-174312 | 11/2018 | |
| KR | 1516567 B1 * | 5/2015 | H01F 1/0536 |
| KR | 10-1548684 | 9/2015 | |
| WO | WO 2018/143229 | 8/2018 | |

OTHER PUBLICATIONS

European Search Report dated Jul. 27, 2022 issued in Application No. 19891663.7.
International Search Report dated Mar. 10, 2020 issued in Application No. PCT/KR2019/016464.
Korean Office Action dated Feb. 15, 2023 issued in Application No. 10-2018-0148750.
Chinese Office Action dated Feb. 8, 2023 issued in Application No. 201980078204.8.

* cited by examiner

【FIG. 1】
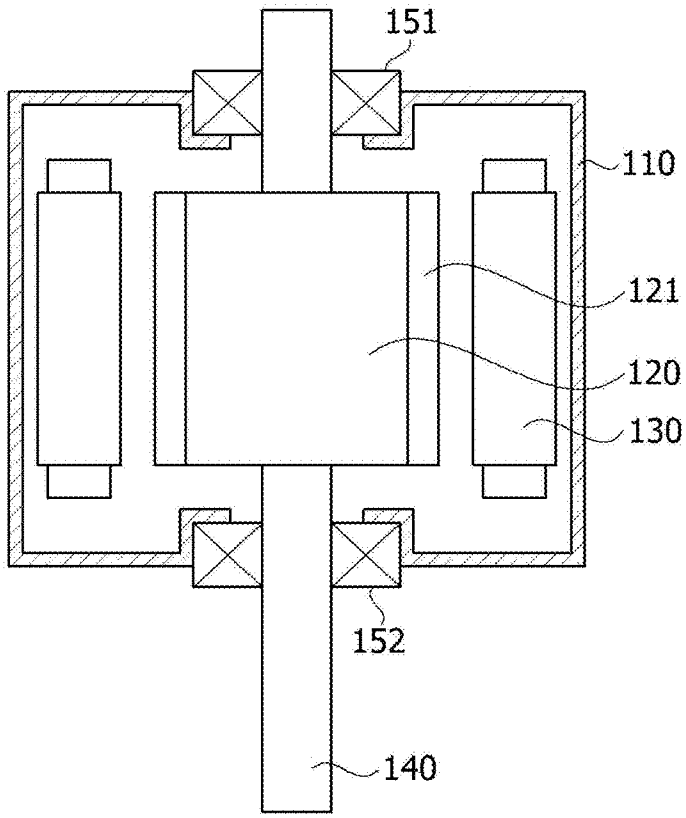

【FIG. 2】
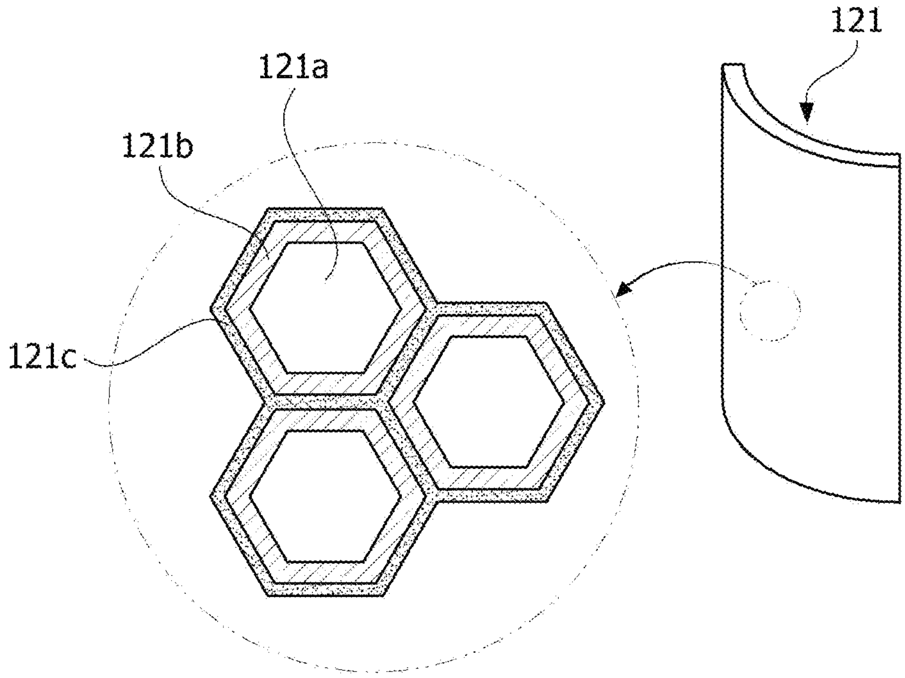

【FIG. 3】
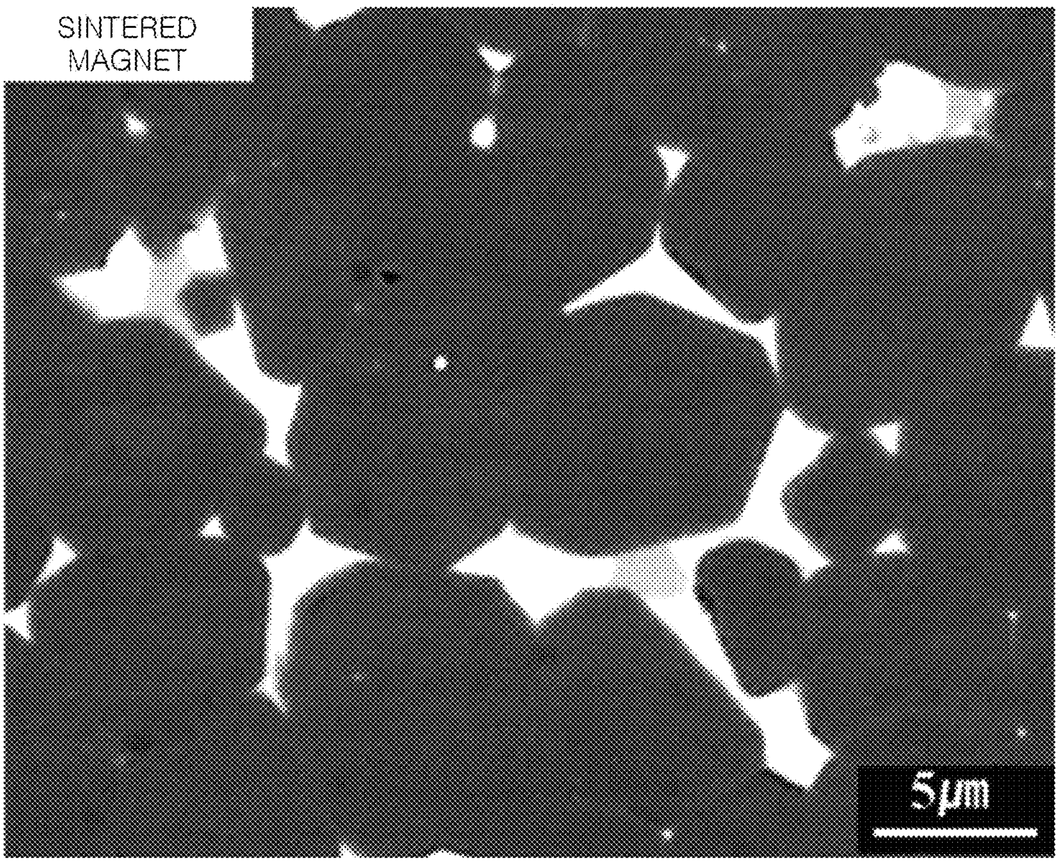

【FIG. 4】
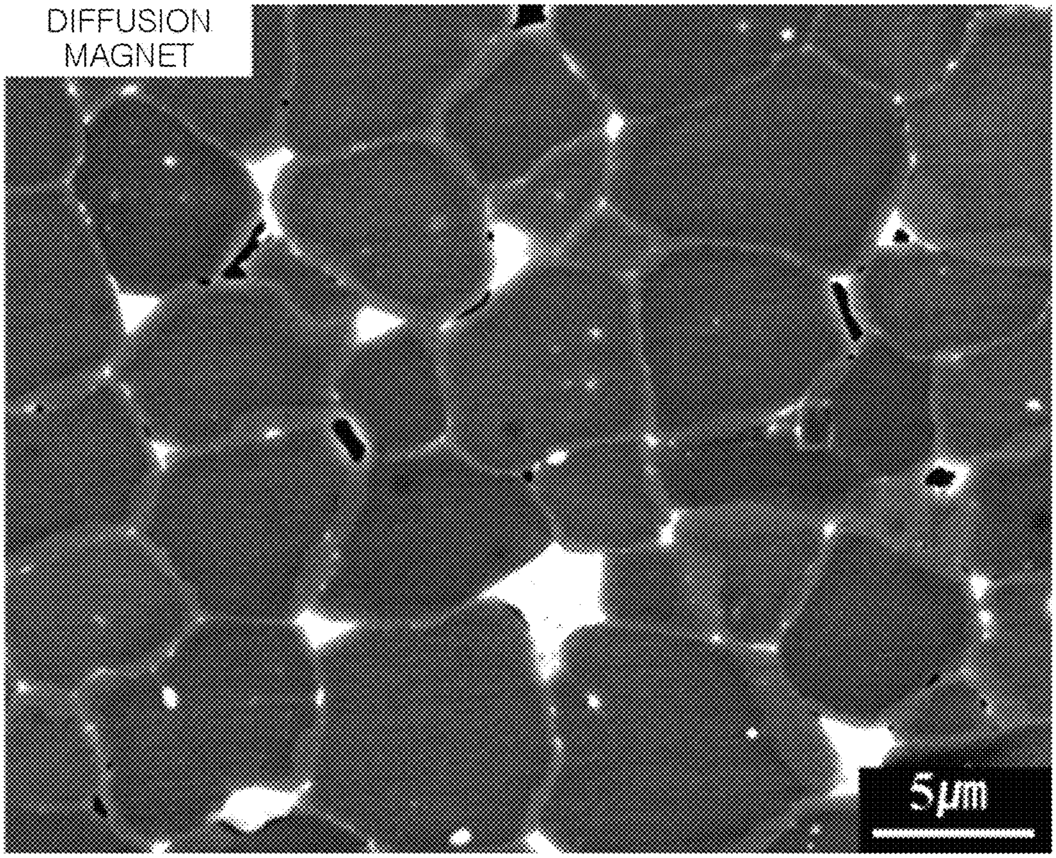

【FIG. 5】
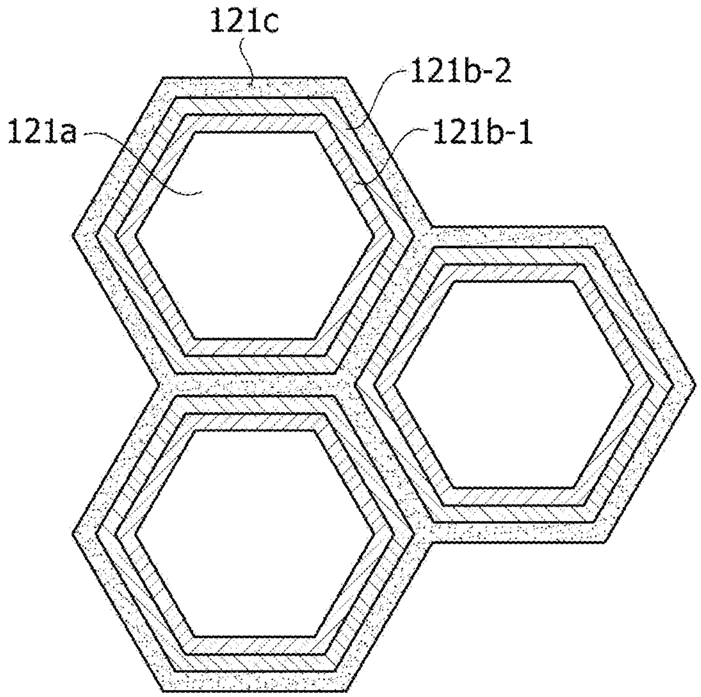

【FIG. 6】
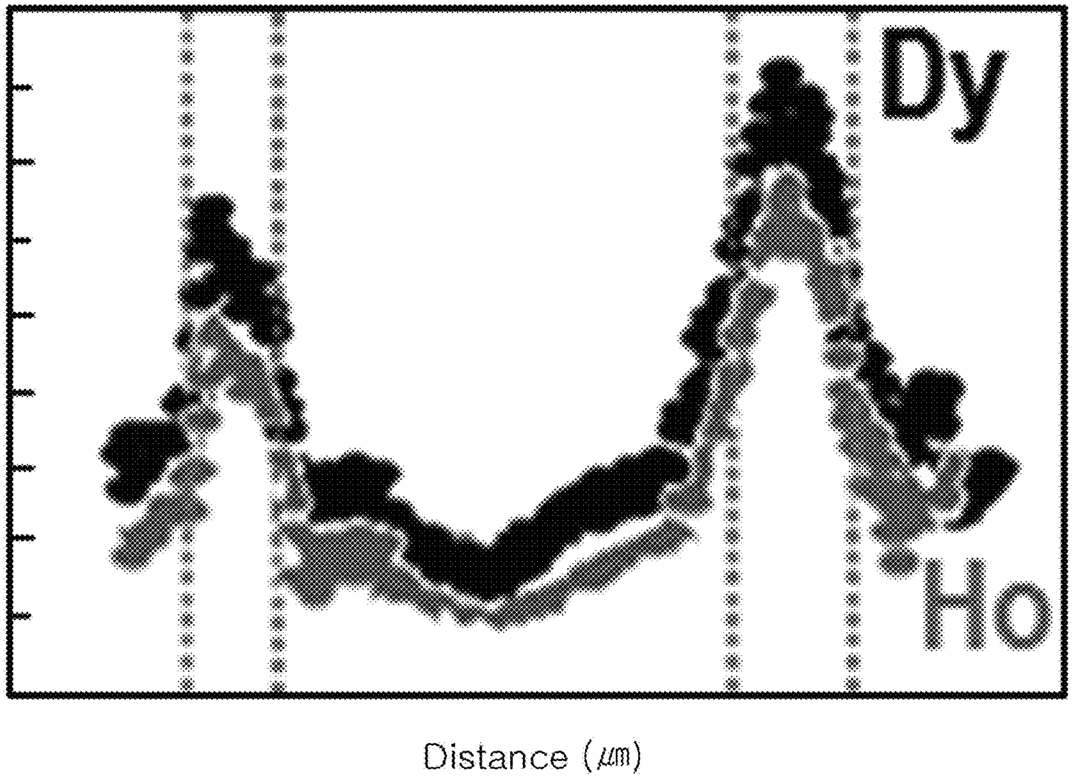

【FIG. 7】
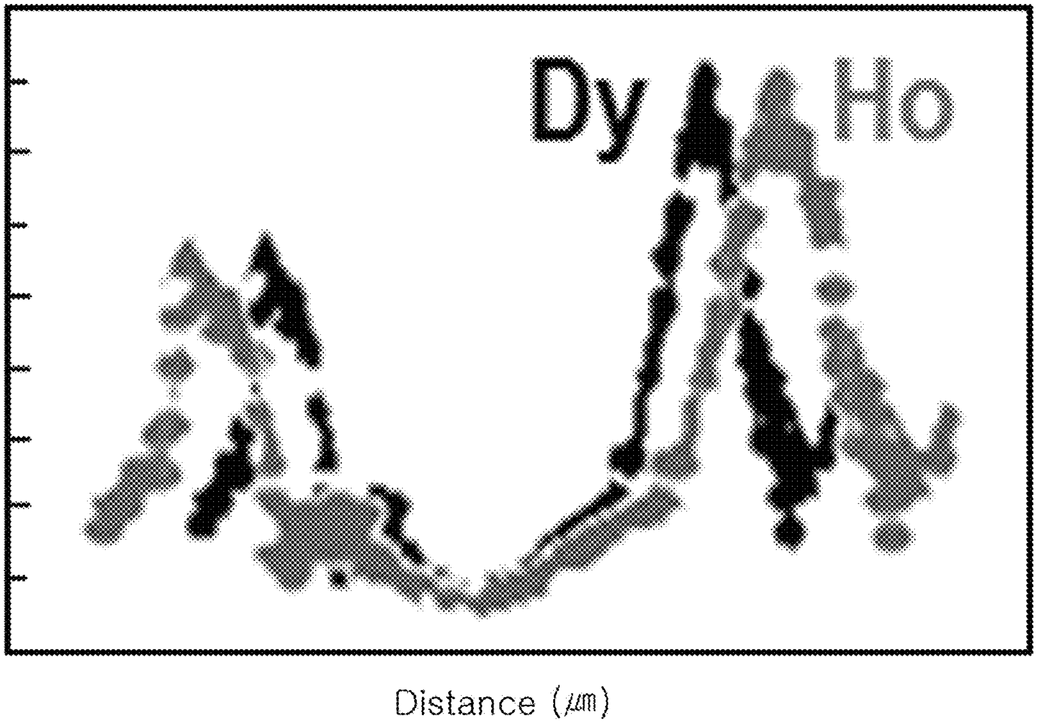
【FIG. 8】
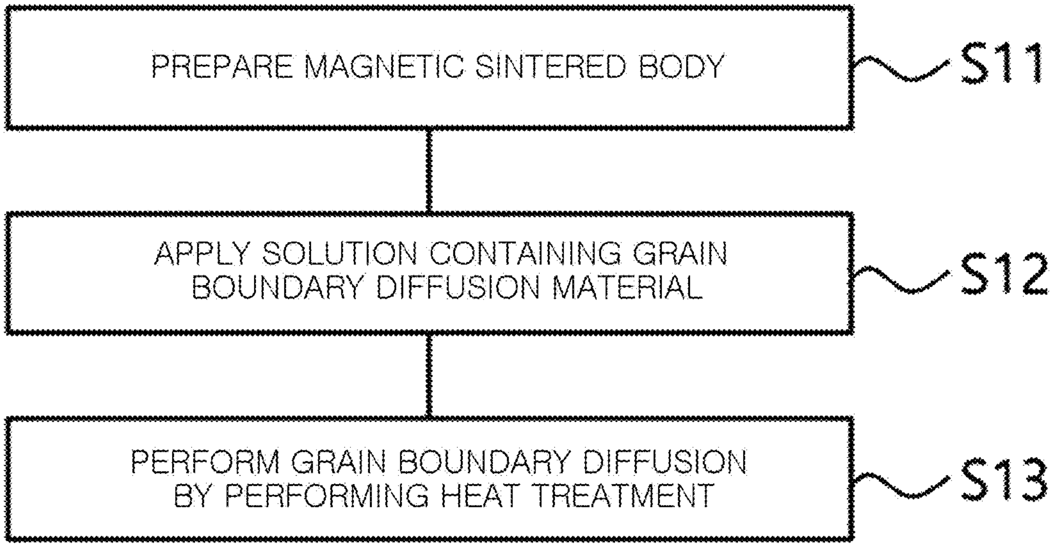

【FIG. 9】
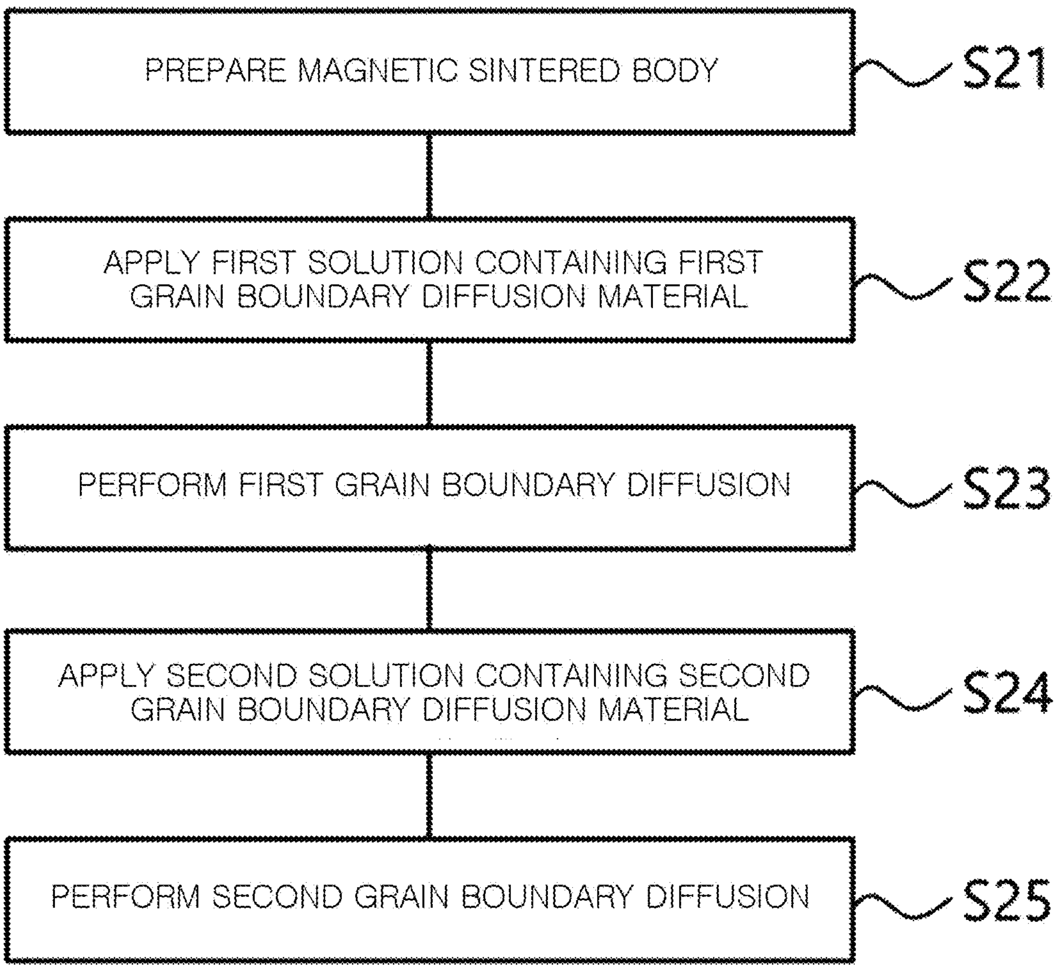

【FIG. 10】
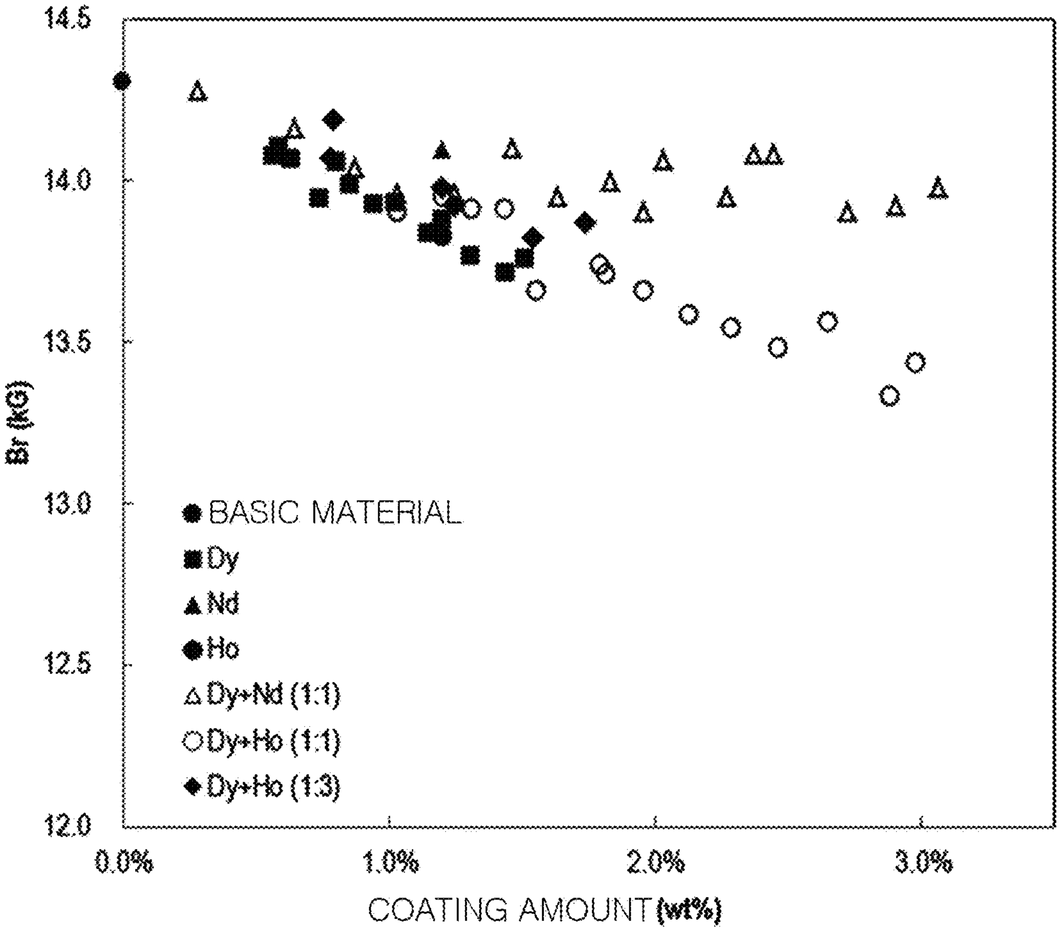

【FIG. 11】
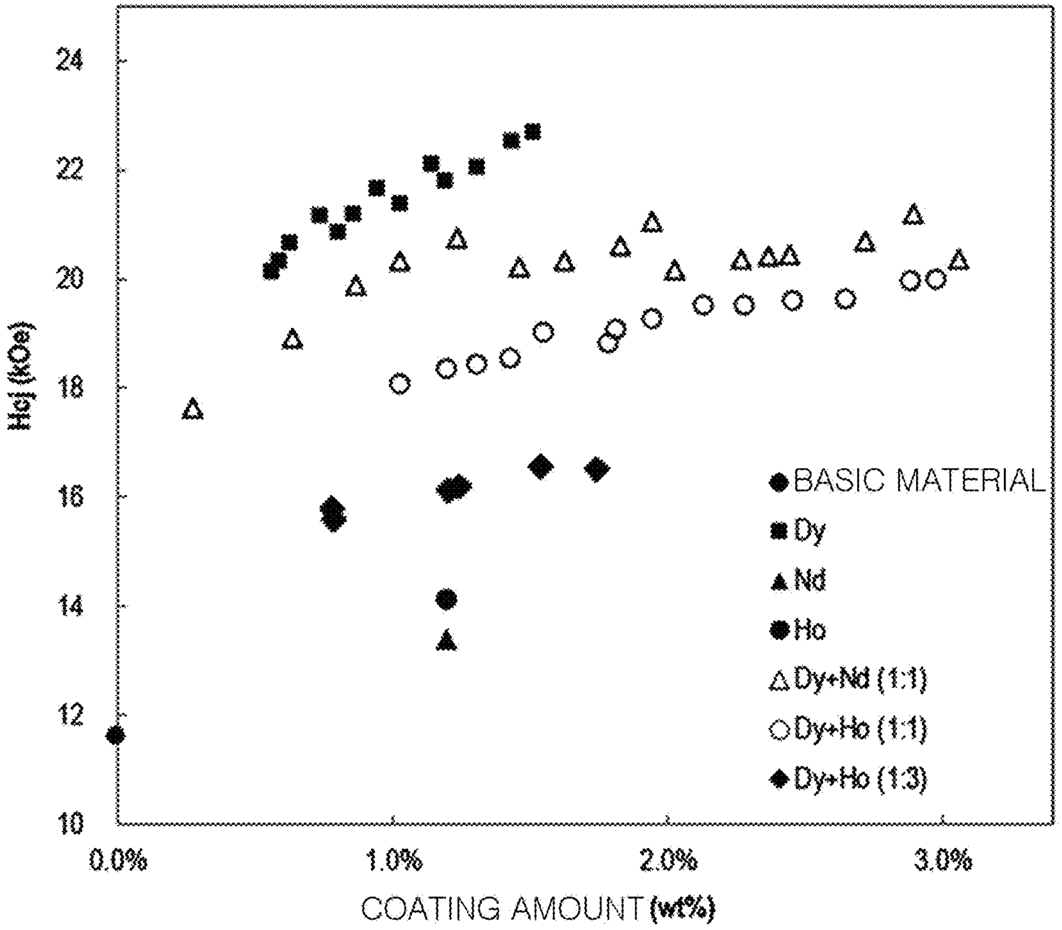

METHOD FOR MANUFACTURING RARE EARTH MAGNET

TECHNICAL FIELD

The present invention relates to a method of manufacturing a rare-earth magnet.

BACKGROUND ART

Generally, since sintered permanent magnets have poor reliability at high temperatures, high coercivity is required to be used as traction motors or EPS motors. In order to secure high coercivity, permanent magnets may be manufactured by adding heavy rare earth elements such as Dy and Tb.

Currently, the most common method is to use composition alloys having a part of Nd substituted with Dy or Tb. Substituting Nd in a Nd2Fe14B compound with these elements increases both the anisotropic magnetic field and the coercivity of the compound. However, the substitution with Dy or Tb reduces the saturation magnetic polarization of the compound. Accordingly, when only coercivity is increased by the above method, there is a problem that the residual current flux density decreases.

In Nd—Fe—B magnets, coercivity is a magnitude of an external magnetic field which creates nuclei of reverse magnetic domains at crystal grain boundaries. Nucleation of reverse magnetic domains is strongly affected by the structure of the crystal grain boundary, and the disorder of the crystal structure in proximity to the boundary causes disorder of a magnetic structure and promotes generation of reverse magnetic domains. Generally, it is said that a magnetic structure extending from the crystal boundary to a depth of about 5 nm contributes to an increase in coercivity.

Meanwhile, by diffusing trace Dy or Tb only in the vicinity of the crystal grain boundaries to increase the anisotropic magnetic field only in the vicinity of the boundaries, coercivity may be increased while a decrease in a residual magnetic flux density is suppressed, and there is a manufacturing method including separately manufacturing a Nd2Fe14B compound composition alloy and a Dy or Tb-rich alloy, mixing the same, and then sintering the mixture. In this method, the Dy or Tb-rich alloy becomes a liquid phase during the sintering and is distributed so as to surround the Nd2Fe14B compound.

As a result, substitution of Nd with Dy or Tb for occurs only in the vicinity of grain boundaries in the compound, such that coercivity may be effectively increased while the decrease in residual current flux density is suppressed. However, the method also has a problem that manufacturing costs increase because expensive Dy or Tb is used.

DISCLOSURE

Technical Problem

The present invention is directed to providing a method of manufacturing a rare-earth magnet, which may reduce a usage amount of heavy rare earth.

The problem to be solved in an embodiment is not limited thereto, and the objectives and effects that may be grasped from the solutions or embodiments of the problems described below are also included.

Technical Solution

One aspect of the present invention provides a method of manufacturing a rare-earth magnet, the method including: preparing a magnetic sintered body including RE, Fe, and B as compositional components (RE is selected from one or two or more selected from rare earth elements); applying a solution containing a grain boundary diffusion material to the sintered body; and performing grain boundary diffusion by heat-treating the sintered body, wherein the grain boundary diffusion material includes a heavy rare earth element (HREE) hydride and a light rare earth element (LREE) hydride.

The heavy rare earth element (HREE) hydride may include at least one of Dy hydride, Tb hydride, and Ho hydride.

The light rare earth element (LREE) hydride may include Nd hydride (NdHx).

An amount of the heavy rare earth element (HREE) hydride may be less than an amount of the light rare earth element (LREE) hydride.

An amount of the heavy rare earth element (HREE) hydride may be greater than an amount of the light rare earth element (LREE) hydride.

Another aspect of the present invention provides a method of manufacturing a rare-earth magnet, the method including: preparing a magnetic sintered body including RE, Fe, and B as compositional components (RE is selected from one or two or more selected from rare earth elements); applying a first solution containing a first grain boundary diffusion material to the sintered body; performing a first grain boundary diffusion by heat-treating the sintered body; applying a second solution containing a second grain boundary diffusion material to the sintered body; and performing a second grain boundary diffusion by heat-treating the sintered body.

The first grain boundary diffusion material may include a heavy rare earth element (HREE) hydride, and the second grain boundary diffusion material may include a light rare earth element (LREE) hydride.

Advantageous Effects

According to an embodiment, since it is possible to reduce a usage amount of heavy rare earth, manufacturing costs can be lowered. Also, decreases in coercivity and magnetic flux density can be prevented.

Various and beneficial advantages and effects of the present invention are not limited to the above description, and will be more easily understood in the course of describing specific embodiments of the present invention.

DESCRIPTION OF DRAWINGS

FIG. 1 is a conceptual diagram of a motor according to an embodiment of the present invention, FIG. 2 is a conceptual diagram of a magnet according to an embodiment of the present invention, FIG. 3 is an enlarged image of a conventional sintered magnet, FIG. 4 is an enlarged image of a diffusion magnet, FIG. 5 is a conceptual diagram of a magnet according to another embodiment of the present invention, FIG. 6 shows an electron probe micro analyzer (EPMA) analysis result showing an amount of rare earth in a magnet according to an embodiment of the present invention, FIG. 7 shows an EPMA analysis result showing an amount of rare earth in a magnet according to another embodiment of the present invention, FIG. 8 is a flow chart for describing a method of manufacturing a rare-earth magnet according to an embodiment of the present invention, FIG. 9 is a flow chart for describing a method of manufacturing a rare-earth magnet according to another embodiment of the present invention, FIG. 10 is a graph of a variation in residual magnetic flux density (Br) according to a coating amount, and FIG. 11 is a graph of a variation in coercivity (Hcj) according to a coating amount.

MODES OF THE INVENTION

Hereinafter, exemplary embodiments of the present invention will be described in detail with reference to the accompanying drawings.

However, the technical spirit of the present invention is not limited to some embodiments to be described, but may be implemented in various different forms, and one or more of components in embodiments may be selectively combined or substituted within the scope of the technical spirit of the present invention.

In addition, terms (including technical and scientific terms) used in the embodiments of the present invention, unless explicitly defined and described, can be interpreted with meanings that can be generally understood by those skilled in the art to which the present invention pertains, and meanings of terms that are generally used, such as terms that are defined in the dictionary, can be interpreted in consideration of the meaning in the context of the related art.

In addition, terms used in the embodiments of the present invention are for describing the embodiments and are not intended to limit the present invention.

In the present specification, the singular form may include the plural form unless specifically stated in the phrase, and "at least one (or one or more) of A, B, and C" may include one or more of all possible combinations of A, B, and C.

In describing the components of the embodiment according to the present invention, terms such as first, second, "A", "B", (a), (b), and the like may be used.

These terms are merely intended to distinguish one component from another component, and the terms do not limit the nature, sequence or order of the components.

Also, it should be noted that when it is described in the specification that one component is "connected," "coupled" or "joined" to another component, the former may be directly "connected," "coupled," and "joined" to the latter or "connected", "coupled", and "joined" to the latter via another component.

Also, it will be understood that, when each component is referred to as being formed or disposed "on (above)" or "under (below)" another component, it can be directly "on" or "under" the other component or be indirectly formed with one or more intervening other components therebetween. Also, it will also be understood that, when each component is referred to as being formed or disposed "on (above)" or "under (below)" another component, it may mean an upward direction and a downward direction based on one component.

FIG. 1 is a conceptual diagram of a motor according to an embodiment of the present invention, FIG. 2 is a conceptual diagram of a magnet according to an embodiment of the present invention, FIG. 3 is an enlarged image of a conventional sintered magnet, and FIG. 4 is an enlarged image of a diffusion magnet.

Referring to FIG. 1, the motor may include a housing 110, a stator 130, a rotor 120, and a rotary shaft 140. The housing 110 may include space for accommodating the stator 130 and the rotor 120. A material and structure of the housing 110 is not particularly limited. The motor of the embodiment may be an assembly having a component located in the housing 110, or may be an aggregate having each component (stator and rotor) located in an upper system.

The housing 110 may further include a cooling structure (not shown) so as to easily discharge internal heat. The cooling structure may be an air-cooling structure or a water-cooling structure, but is not limited thereto.

The stator 130 may be located in the inner space of the housing 110. The stator 130 may include a stator core and a coil. The stator core may include a plurality of split cores coupled in an axial direction, but is not necessarily limited thereto.

The rotor 120 may be located to be rotatable with respect to the stator 130. The rotor 120 may include a plurality of magnets 121 located on an outer circumferential surface of a rotor core 210. However, a magnet 121 may be inserted and located in the rotor core 210.

The rotary shaft 140 may be coupled to a central portion of the rotor 120. Accordingly, the rotor 120 and the rotary shaft 140 may rotate together. The rotary shaft 140 may be supported by a first bearing 151 located at one side thereof and a second bearing 152 located at the other side thereof.

The motor may be a traction motor or an EPS motor, but is not necessarily limited thereto and may be applied to various types of motors. Also, a magnet according to an embodiment may be applied to various apparatuses in which a magnet is mounted in addition to the motor.

Referring to FIG. 2, the magnet 121 may include a crystal structure 121*a* of a magnetic sintered body including RE, Fe, and B as compositional components, and a diffusion layer 121*b* diffused at a crystal grain boundary of the crystal structure 121*a*. Also, an Nd-rich area 121*c* may be formed between the crystal 121*a* and the crystal 121*a*. The Nd-rich area 121*c* may be defined as an area in which a composition of Nd is relatively higher than that of other compositions.

The magnetic sintered body may be manufactured by using a rare-earth magnet powder including RE, Fe, and B as compositional components. Here, RE may be selected from one or two or more from one or more rare earth elements of Nd, Pr, La, Ce, Ho, Dy, and Tb. Hereinafter, the rare-earth magnet powder is described as an Nd—Fe—B-based sintered magnet, but the type of magnet powder is not necessarily limited thereto.

The diffusion layer 121*b* may include a heavy rare earth element (HREE) and a light rare earth element (LREE). The heavy rare earth may include at least one of Pm, Sm, Eu, Gd, Dy, Tb, and Ho. Also, the light rare earth may include at least one of La, Ce, Pr, and Nd. For example, a composition of the diffusion layer 121*b* may include a composition of Dy/Nd, Tb/Nd, Ho/Nd, Dy/Pr, Dy/Ho/Nd, Dy/Ho/Pr, or the like.

According to an embodiment, a light rare earth (Ho, Nd) having a relatively low price may be used instead of a heavy rare earth (Dy, Tb) having a relatively high price. Accordingly, there is an advantage of reducing a usage amount of the heavy rare earth (Dy, Tb) to reduce manufacturing costs.

However, the present invention is not necessarily limited thereto, and the diffusion layer 121*b* may consist of only heavy rare earths or may consist of only light rare earths. For example, the diffusion layer 121*b* may also consist of Dy/Tb, Tb/Ho, Dy/Tb/Ho, and Pr/Nd.

The diffusion layer 121*b* may be formed by wet-coating a rare earth element powder on a base magnet, which is sintered permanent magnet, and then performing diffusion at a high temperature. That is, when the permanent magnet coated with the rare earth element powder is heat-treated at a high temperature, some of the rare earth elements diffuse through grain boundaries of the magnet to thereby form a core-shell structure. That is, the diffusion layer 121*b* may be defined as a shell. Referring to FIGS. 3 and 4, a general sintered magnet and a diffusion magnet in which rare earth elements are diffused may be distinguished from each other in a BSE SEM image.

FIG. 5 is a conceptual diagram of a magnet according to another embodiment of the present invention, FIG. 6 is an electron probe micro analyzer (EPMA) analysis result showing an amount of rare earth in a magnet according to an embodiment of the present invention, and FIG. 7 is an EPMA analysis result showing an amount of rare earth in a magnet according to another embodiment of the present invention.

The diffusion layer 121*b* may form a single layer even when a plurality of rare earths are mixed. However, as shown in FIG. 5, the diffusion layer 121*b* may be divided into a plurality of layers. For example, an inner layer 121*b*-1 may consist of an element having a relatively high diffusion rate, and an outer layer 121*b*-2 may consist of an element having a relatively low diffusion rate. For example, when Dy and Ho are mixed, applied to a magnet, and then heat-treated, Dy that is rapidly diffused may be formed on the inside and Ho that is slowly diffused may be formed in an outer layer.

As a result of EPMA analysis, as shown in FIG. 6, Dy and Ho are detected at the same position in the crystal to thereby form a single layer, whereas as shown in FIG. 7, Dy is located on an inner side of Ho to thereby form a plurality of layers. According to an embodiment, a plurality of layers may be intentionally formed in addition to the case where the layers are divided by the diffusion rate. For example, when a separate coating process and a heat treatment process are performed for each rare earth element powder, the diffusion layer 121*b* may be divided into a plurality of layers.

Detection positions and detection amounts of the diffused elements may be finally identified via a transmission electron microscope (TEM), electron backscatter diffraction (EBSD) analysis, and a secondary-ion mass spectrometers (SIMS), in addition to the EPMA. In this case, an initial coating amount and detected amount before diffusion may vary depending on the degree of diffusion and location of diffusion after diffusion.

FIG. 8 is a flow chart for describing a method of manufacturing a rare-earth magnet according to an embodiment of the present invention.

Referring to FIG. 8, the method of manufacturing a rare-earth magnet according to an embodiment of the present invention includes: a step S1*l* of preparing a magnetic sintered body including RE, Fe, and B as compositional components; a step S12 of applying a solution containing a grain boundary diffusion material to the sintered body; and a step S13 of performing grain boundary diffusion by heat-treating the sintered body.

In the step S11 of preparing a magnetic sintered body including RE, Fe, and B as compositional components, first, a rare earth magnet powder including an RE-B-TM-Fe compositional component may be used. Here, RE may be a rare earth element, and TM may be a 3*d* transition element. Although not necessarily limited thereto, an amount of RE may be 28-35 parts by weight based on the total weight of 100 parts by weight of the rare earth magnet powder, an amount of B may be 0.5-1.5 parts by weight, and an amount of TM may be 0-15 parts by weight. Also, as the balance, Fe may be included.

In an embodiment, an alloy of the composition may be melted by a vacuum induction heating method and manufactured into an alloy ingot by using a strip casting method. In order to improve the pulverization ability of these alloy ingots, hydrotreatment and dehydrogenation are performed in a temperature range of room temperature to 600° C., and then, these alloy ingots may be manufactured into a uniform and fine powder having a particle size of 1-10 μm by using pulverization methods such as jet milling, atrita milling, ball milling, and vibration milling.

A process of manufacturing a powder of 1-10 μm from an alloy ingot is preferably performed in a nitrogen or inert gas atmosphere to prevent deterioration of magnetic characteristics due to contamination of oxygen.

Afterwards, pressing in a magnetic field may be performed by using the fine powder. For example, a mold was filled with the mulled powder, and the mulled powder was aligned by applying a direct current magnetic field by electromagnets positioned to the right and left of the mold and was simultaneously compression-molded by upper and lower punches to thereby manufacture a molded body. The pressing in a magnetic field may be performed in a nitrogen or inert gas atmosphere to prevent deterioration of magnetic characteristics due to contamination of oxygen.

When the pressing in a magnetic field is completed, the molded body may be sintered. Although sintering conditions are not limited, the sintering may be performed at a temperature within a range of 900° C. to 1,100° C., and a heating rate at 700° C. or more may be adjusted within a range of 0.5-15° C./min.

For example, the molded body obtained by the pressing in a magnetic field is charged into a sintering furnace and sufficiently maintained in a vacuum atmosphere and at a temperature of 400° C. or less to thereby completely remove residual impure organic materials. Afterwards, the temperature is raised to within a range of 900° C. to 1,100° C. and maintained for 1-4 hours to perform a sintering densification process.

A sintering atmosphere is preferably an inert gas atmosphere such as vacuum and argon, and a heating rate may be adjusted to 0.1-10° C./min, preferably, 0.5-15° C./min, at a temperature of 700° C. or more.

Optionally, the sintered body after the sintering may be stabilized by being subjected to a post heat treatment in a range of 400~900° C. for 1-4 hours, and then processed into a predetermined size to thereby manufacture a rare-earth magnet sintered body.

In the step S12 of applying a solution, a solution containing a grain boundary diffusion material may be applied to the manufactured magnet. The grain boundary diffusion material may include heavy rare earth element (HREE) hydride and light rare earth element (LREE) hydride. According to an embodiment, there is an advantage of reducing manufacturing costs by diffusing a large amount of a light rare earth having a relatively low price.

The heavy rare earth element (HREE) hydride may include at least one of Dy hydride, Tb hydride, and Ho hydride, and the light rare earth element (LREE) hydride may include Nd hydride (NdHx). At this time, an amount in parts by weight of the heavy rare earth element (HREE) hydride may be less than an amount in parts by weight of the light rare earth element (LREE) hydride based on 100 parts by weight of the grain boundary diffusion material. As a result, there is an advantage of further lowering manufacturing costs by increasing a weight of a light rare earth having a relatively low price in a diffusion process. However, the present invention is not necessarily limited thereto, and an amount in parts by weight of the heavy rare earth element (HREE) hydride may be greater than or equal to an amount in parts by weight of the light rare earth element (LREE) hydride in consideration of a limit of the diffusion.

In detail, any one of the Ho hydride, the Dy hydride, and the Tb hydride and at least one of light rare earth element hydrides may be mixed to prepare a grain boundary diffusion material, and a ratio of the grain boundary diffusion material and an alcohol may be uniformly mixed at a ratio of 50%:50%, to prepare a rare earth compound slurry. While the prepared slurry is put into a beaker and dispersed uniformly using an ultrasonic cleaner, the processed body is immersed therein, and then a solution may be uniformly applied to a magnet surface.

In the step S13 of performing grain boundary diffusion, in order to diffuse the applied heavy rare earth element (HREE) hydride and light rare earth element (LREE) hydride into the crystal grain boundaries in the magnet, the sintered magnet coated with the solution may be charged into a heating furnace, heated so that a heating rate in an argon atmosphere is 0.1° C./min to 10° C./min, and thus maintained at a temperature of 700° C. to 1,000° C. for 4 hours to 8 hours. In this process, the heavy rare earth element hydride is decomposed into a heavy rare earth and the light rare earth element hydride is decomposed into a light rare earth, the heavy rare earth element hydride and the light rare earth element hydride diffuse inside the magnet, and an infiltration reaction may be performed.

At this time, in order to prevent the occurrence of residual stress inside the magnet due to rapid diffusion, a step of removing stress by performing heat treatment within a range of 400° C. to 1,000° C. after the diffusion reaction is completed may be further included.

FIG. 9 is a flow chart for describing a method of manufacturing a rare-earth magnet according to another embodiment of the present invention.

Referring to FIG. 9, a method of manufacturing a rare-earth magnet according to another embodiment of the present invention includes: a step S21 of preparing a magnetic sintered body including RE, Fe, and B as compositional components; a step S22 of applying a first solution containing a first grain boundary diffusion material to the sintered body; a step S23 of performing a first grain boundary diffusion by heat-treating the sintered body; a step S24 of applying a second solution containing a second grain boundary diffusion material to the sintered body; and a step S25 of performing a second grain boundary diffusion by heat-treating the sintered body.

The step S21 of preparing a magnetic sintered body may be the same as the step S11 described above.

In the step S22 of applying a first solution, the first grain boundary diffusion material consisting of a heavy rare earth element hydride and/or a light rare earth element hydride and an alcohol may be adjusted to a ratio of 50%:50% and then uniformly mixed to prepare a rare earth compound slurry. Afterwards, while the prepared slurry is put into a beaker and dispersed uniformly by using an ultrasonic cleaner, the processed body is immersed therein and maintained for 1-2 minutes, such that the slurry may be uniformly applied to a magnet surface.

In the step S23 of performing a first grain boundary diffusion, in order to diffuse the applied rare earth compound into the crystal grain boundaries in the magnet, the sintered magnet coated with the solution may be charged into a heating furnace, heated in an argon atmosphere, and then maintained at a temperature of 700° C. to 1,000° C. for 4 hours to 8 hours. In this process, the rare earth compound is decomposed into a rare earth and then diffused inside the magnet so that an infiltration reaction may be performed.

After the diffusion treatment, a diffusion layer is removed from the surface, and then stress-relief heat treatment may be performed at a temperature of 400° C. to 1,000° C.

In the step S24 of applying a second solution, the second grain boundary diffusion material consisting of a heavy rare earth element hydride and/or a light rare earth element hydride and an alcohol may be adjusted to a ratio of 50%:50% and then uniformly mixed to prepare a rare earth compound slurry. Afterwards, while the prepared slurry is put into a beaker and dispersed uniformly by using an ultrasonic cleaner, the processed body is immersed therein and maintained for 1-2 minutes, such that the slurry may be uniformly applied to a magnet surface.

At this time, the first grain boundary diffusion material may be different from the second grain boundary diffusion material. For example, the first grain boundary diffusion material may be a heavy rare earth element hydride, and the second grain boundary diffusion material may be a light rare earth element hydride. Conversely, the first grain boundary diffusion material may be a light rare earth element hydride, and the second grain boundary diffusion material may be a heavy rare earth element hydride.

A coating amount of the first grain boundary diffusion material may be different from a coating amount of the second grain boundary diffusion material. For example, an amount of the first grain boundary diffusion material (heavy rare earth element hydride) may be 0.1 parts by weight to 1.0 part by weight based on the total weight of 100 parts by weight of the magnet, and an amount of the second grain boundary diffusion material (light rare earth element hydride) may be 0.1 parts by weight to 0.5 parts by weight based on the total weight of 100 parts by weight of the magnet. Conversely, an amount of the first grain boundary diffusion material (heavy rare earth element hydride) may be 0.1 parts by weight to 0.5 parts by weight based on the total weight of 100 parts by weight of the magnet, and an amount of the second grain boundary diffusion material (light rare earth element hydride) may be 0.1 parts by weight to 1.0 part by weight based on the total weight of 100 parts by weight of the magnet.

In the step S25 of performing a second grain boundary diffusion, in order to diffuse the applied rare earth compound into crystal grain boundaries in the magnet, the applied body may be charged into a heating furnace, heated in argon atmosphere, and then maintained at a temperature of about 700° C. to about 1,000° C. for 4 hours to 8 hours. In this process, the rare earth compound is decomposed into a rare earth and then diffused inside the magnet so that an infiltration reaction may be performed.

After the diffusion treatment, a diffusion layer is removed from the surface, and then stress-relief heat treatment may be performed at a temperature of 400° C. to 1,000° C.

According to an embodiment, diffusion efficiency of the rare earths in the crystal grain boundaries may increase by the first diffusion and the second diffusion. Accordingly, coercivity and/or residual current flux density may be improved compared to the case where only the first diffusion is performed.

Hereinafter, it will be described in more detail through the following examples.

Example 1

An alloy composed of X wt % RE-Y wt % B-Z wt % TM-Bal. wt % Fe (wherein, RE=rare-earth element, TM=3d transition element, X=28-35, Y=0.5-1.5, Z=0-15) was melted in an argon atmosphere by an induction heating method and then rapidly cooled using a strip casting method to thereby manufacture an alloy strip.

In the process of coarsely pulverizing the manufactured alloy strip, the strip was charged into a vacuum furnace, vacuum-exhausted, and then maintained in a hydrogen atmosphere for at least 2 hours, to allow hydrogen to be absorbed into the strip. Subsequently, the strip was heated to 600° C. in a vacuum atmosphere to thereby remove hydrogen present inside the strip. The coarsely pulverized and hydrotreated powder was used to manufacture a uniform and fine powder having an average particle diameter of 1-5.0 μm by a pulverization method using a jet mill technique. At this time, the process of manufacturing the alloy strip into fine powder was performed in a nitrogen or inert gas atmosphere in order to prevent the deterioration of magnetic characteristics due to contamination of oxygen.

The fine rare earth powder which had been pulverized by the jet mill was used to perform pressing in a magnetic field as follows. A mold was filled with the rare earth powder in a nitrogen atmosphere, and the rare earth powder was aligned in a uniaxial direction by applying a direct current magnetic field by electromagnets positioned to the right and left of the mold and was compression-molded by applying the pressure of upper and lower punches simultaneously, to thereby manufacture a molded body. The molded body obtained by the pressing in a magnetic field was charged into a sintering furnace and sufficiently maintained in a vacuum atmosphere and at a temperature of 400° C. or less to completely remove residual impure organic materials, and the temperature was raised to 1,050° C. and maintained for 2 hours to perform a sintering densification process.

After the sintered body was manufactured by the above sintering manufacturing process, the sintered body was processed into a magnet having a size of 12.5×12.5×5 mm, and then the following grain boundary diffusion process was performed to improve high-temperature magnetic characteristics.

After the processed magnet was immersed in an alkaline degreasing agent solution, the processed magnet was rubbed with a ceramic ball having a diameter of 2-10 pi to remove any oil constituent on a surface of the magnet, the magnet was washed clean with distilled water several times, and thus the residual degreasing agent was completely removed.

In order to uniformly apply a rare earth compound to the surface of the washed processed body, Nd-Hydride, Ho-Hydride, Dy-Hydride, and Tb-Hydride compounds and an alcohol were adjusted to ratios of 50%:50%, respectively, and uniformly mulled, to thereby prepare a rare earth compound slurry. Then, while the prepared slurry was put into a beaker and dispersed uniformly by using an ultrasonic cleaner, the processed body was immersed therein and maintained for 1-2 minutes, such that the rare earth compound was uniformly coated on the surface of the magnet.

In order to diffuse the coated rare earth compound into a crystal grain boundary inside the magnet, the coated body was charged into a heating furnace, heated at a heating rate of 1° C./min in an argon atmosphere, and maintained at a temperature of 900° C. for 6 hours, so that the rare earth compound diffused into the magnet and an infiltration reaction was performed. After the diffusion treatment, a diffusion layer was removed from the surface, followed by stress-relief heat treatment at a temperature of 900° C. for 10 hours. Also, after completion of the diffusion treatment, the diffusion treatment was performed under the same conditions again using the Nd-Hydride, Ho-Hydride, Dy-Hydride, and Tb-Hydride compounds as coating materials to thereby manufacture a final specimen.

Table 1 shows an evaluation result of magnetic characteristics of magnets that were manufactured by manufacturing a sintered body composed of 31 wt % Nd-1 wt % B-2 wt % TM-Bal. wt % Fe (M=Cu, Al, Nb, Co) and then performing first and second grain boundary diffusions using the Nd-Hydride, Ho-Hydride, Dy-Hydride, and Tb-Hydride compounds as coating materials.

TABLE 1

| Sample | First diffusion | | Second diffusion | | Room temperature magnetic characteristics | |
|---|---|---|---|---|---|---|
| manufacturing condition | Coating material | Coating amount (wt %) | Coating material | Coating amount (wt %) | Residual magnetic flux density, Br (kG) | Coercivity, Hcj (kOe) |
| Comparative Example 1-1 | Nd-Hydride | 1.0 | x | x | 13.8 | 15.2 |
| Comparative Example 1-2 | Ho-Hydride | 1.0 | x | x | 13.7 | 15.9 |
| Comparative Example 1-3 | Dy-Hydride | 1.0 | x | x | 13.6 | 21.5 |
| Comparative Example 1-4 | Tb-Hydride | 1.0 | x | x | 13.6 | 25.4 |
| Example 1-1 | Nd-Hydride | 0.5 | Nd-Hydride | 0.5 | 13.8 | 16.4 |
| Example 1-2 | Ho-Hydride | 0.5 | Ho-Hydride | 0.5 | 13.7 | 17.2 |
| Example 1-3 | Dy-Hydride | 0.5 | Dy-Hydride | 0.5 | 13.6 | 22.8 |
| Example 1-4 | Tb-Hydride | 0.5 | Tb-Hydride | 0.5 | 13.6 | 26.9 |

Referring to Table 1, it may be confirmed that in the case of Comparative Example 1-1, the Nd hydride diffused only once such that the residual magnetic flux density (Br) was 13.8 (kG) and the coercivity was 15.2 (kOe), whereas in the case of Example 1-1, the Nd hydride diffused twice such that the residual magnetic flux density (Br) had the same performance level of 13.8 (kG) and the coercivity was improved to 16.4 (kOe). It may be confirmed that Examples 1-2 to 1-4 also had improved coercivities. That is, it may be confirmed that a repetitive diffusion process may improve magnetic characteristics. At this time, it may be confirmed that the coercivity was most improved when diffusion was performed twice using Tb-Hydride.

Example 2

An alloy composed of X wt % RE-Y wt % B-Z wt % TM-Bal. wt % Fe (wherein, RE=rare-earth element, TM=3d transition element, X=28-35, Y=0.5-1.5, Z=0-15) was melted in an argon atmosphere by an induction heating method and then rapidly cooled by using a strip casting method to thereby manufacture an alloy strip.

In the process of coarsely pulverizing the manufactured alloy strip, the strip was charged into a vacuum furnace, vacuum-exhausted, and then maintained in a hydrogen atmosphere for at least 2 hours, to allow hydrogen to be absorbed into the strip. Subsequently, the strip was heated to 600° C. in a vacuum atmosphere to thereby remove hydrogen present inside the strip. The coarsely pulverized and hydrotreated powder was used to manufacture a uniform and fine powder having an average particle diameter of 1-5.0 μm by a pulverization method using a jet mill technique. At this time, the process of manufacturing the alloy strip into fine powder was performed in a nitrogen or inert gas atmosphere in order to prevent the deterioration of magnetic characteristics due to contamination of oxygen.

The fine rare earth powder which had been pulverized by the jet mill was used to perform pressing in a magnetic field as follows. A mold was filled with the rare earth powder in a nitrogen atmosphere, and the rare earth powder was aligned in a uniaxial direction by applying a direct current magnetic field by electromagnets positioned to the right and left of the mold and was compression-molded by applying the pressure of upper and lower punches simultaneously, to thereby manufacture a molded body. The molded body obtained by the pressing in a magnetic field was charged into a sintering furnace and sufficiently maintained in a vacuum atmosphere and at a temperature of 400° C. or less to completely remove residual impure organic materials, and the temperature was raised to 1,050° C. and maintained for 2 hours to perform a sintering densification process.

After the sintered body was manufactured by the above sintering manufacturing process, the sintered body was processed into a magnet having a size of 12.5×12.5×5 mm, and then the following grain boundary diffusion process was performed to improve high-temperature magnetic characteristics.

After the processed magnet was immersed in an alkaline degreasing agent solution, the processed magnet was rubbed with a ceramic ball having a size of 2-10 pi to remove any oil constituent on a surface of the magnet, the magnet was washed clean with distilled water several times, and thus the residual degreasing agent was completely removed.

In order to uniformly apply a rare earth compound to the surface of the washed processed body, a Nd-Hydride compound and an alcohol were adjusted to a ratio of 50%:50% and uniformly mulled, to thereby prepare a rare earth compound slurry. Then, while the prepared slurry was put into a beaker and dispersed uniformly by using an ultrasonic cleaner, the processed body was immersed therein and maintained for 1-2 minutes, such that the rare earth compound was uniformly coated on the surface of the magnet. In order to diffuse the coated rare earth compound into a crystal grain boundary inside the magnet, the coated body was charged into a heating furnace, heated at a heating rate of 1° C./min in an argon atmosphere, and maintained at a temperature of 900° C. for 6 hours, so that the rare earth compound diffused into the magnet and an infiltration reaction was performed. After the diffusion treatment, a diffusion layer was removed from the surface, followed by stress-relief heat treatment at a temperature of 900° C. for 10 hours.

Also, after completion of the diffusion treatment, the diffusion treatment was performed under the same conditions again using the Ho-Hydride, Dy-Hydride, and Tb-Hydride compounds as coating materials to thereby manufacture a final specimen.

Table 2 shows an evaluation result of magnetic characteristics of magnets that were manufactured by manufacturing a sintered body composed of 31 wt % Nd-1 wt % B-2 wt % TM-Bal. wt % Fe (M=Cu, Al, Nb, Co), performing a first grain boundary diffusion using the Nd-Hydride compound as a coating material, and then performing a second grain boundary diffusion using the Ho-Hydride, Dy-Hydride, and Tb-Hydride compounds.

TABLE 2

| Sample | First diffusion | | Second diffusion | | Room temperature magnetic characteristics | |
|---|---|---|---|---|---|---|
| manufacturing conditions | Coating material | Coating amount (wt %) | Coating material | Coating amount (wt %) | Residual magnetic flux density, Br (kG) | Coercivity, Hcj (kOe) |
| Comparative Example 1-2 | Ho-Hydride | 1.0 | x | x | 13.7 | 15.9 |
| Comparative Example 1-3 | Dy-Hydride | 1.0 | x | x | 13.6 | 21.5 |
| Comparative Example 1-4 | Tb-Hydride | 1.0 | x | x | 13.6 | 25.4 |
| Example 2-1 | Nd-Hydride | 0.5 | Ho-Hydride | 1.0 | 13.7 | 17.8 |
| Example 2-2 | Nd-Hydride | 0.5 | Dy-Hydride | 1.0 | 13.6 | 23.5 |
| Example 2-3 | Nd-Hydride | 0.5 | Tb-Hydride | 1.0 | 13.6 | 27.3 |

Referring to Table 2, it may be confirmed that in the case of Comparative Example 1-2, when the Ho hydride diffused only once, the residual magnetic flux density (Br) was 13.7 (kG) and the coercivity was 15.9 (kOe), whereas in the case of Example 2-1, the Nd hydride firstly diffused and then the Ho hydride secondarily diffused, and as a result, the residual magnetic flux density (Br) had the same performance level of 13.7 (kG) and the coercivity was improved to 17.8 (kOe). Also, it may be confirmed that Examples 2-2 and 2-3 also had improved coercivities. That is, it may be confirmed that a repetitive diffusion process using different coating materials may improve magnetic characteristics. At this time, it may be confirmed that in the case of Example 2-3 where the Nd hydride firstly diffused and then the Tb hydride diffused, the coercivity was significantly improved.

Example 3

An alloy composed of X wt % RE-Y wt % B-Z wt % TM-Bal. wt % Fe (wherein, RE=rare-earth element, TM=3d transition element, X=28-35, Y=0.5-1.5, Z=0-15) was melted in an argon atmosphere by an induction heating method and then rapidly cooled by using a strip casting method, to thereby manufacture an alloy strip.

In the process of coarsely pulverizing the manufactured alloy strip, the strip was charged into a vacuum furnace, vacuum-exhausted, and then maintained in a hydrogen atmosphere for at least 2 hours, to allow hydrogen to be absorbed into the strip. Subsequently, the strip was heated to 600° C. in a vacuum atmosphere to thereby remove hydrogen present inside the strip. The coarsely pulverized and hydrotreated powder was used to manufacture a uniform and fine powder having an average particle diameter of 1-5.0 μm by a pulverization method using a jet mill technique. At this time, the process of manufacturing the alloy strip into fine powder was performed in a nitrogen or inert gas atmosphere in order to prevent the deterioration of magnetic characteristics due to contamination of oxygen.

The fine rare earth powder which had been pulverized by the jet mill was used to perform pressing in a magnetic field as follows. A mold was filled with the rare earth powder in a nitrogen atmosphere, and the rare earth powder was aligned in a uniaxial direction by applying a direct current magnetic field by electromagnets positioned to the right and left of the mold and was compression-molded by applying the pressure of upper and lower punches simultaneously, to thereby manufacture a molded body. The molded body obtained by the pressing in a magnetic field was charged into a sintering furnace and sufficiently maintained in a vacuum atmosphere and at a temperature of 400° C. or less to completely remove residual impure organic materials, and the temperature was raised to 1,050° C. and maintained for 2 hours to perform a sintering densification process.

After the sintered body was manufactured by the above sintering manufacturing process, the sintered body was processed into a magnet having a size of 12.5×12.5×5 mm, and then the following grain boundary diffusion process was performed to improve high-temperature magnetic characteristics. After the processed magnet was immersed in an alkaline degreasing agent solution, the processed magnet was rubbed with a ceramic ball having a size of 2-10 pi to remove any oil constituent on a surface of the magnet, the magnet was washed clean with distilled water several times, and thus the residual degreasing agent was completely removed.

In order to uniformly apply a rare earth compound to the surface of the washed processed body, Ho-Hydride, Dy-Hydride, and Tb-Hydride compounds and an alcohol were adjusted to a ratio of 50%:50%, respectively, and uniformly mulled, to thereby prepare a rare earth compound slurry. Then, while the prepared slurry was put into a beaker and dispersed uniformly by using an ultrasonic cleaner, the processed body was immersed therein and maintained for 1-2 minutes, such that the rare earth compound was uniformly coated on the surface of the magnet.

In order to diffuse the coated rare earth compound into a crystal grain boundary inside the magnet, the coated body was charged into a heating furnace, heated at a heating rate of 1° C./min in an argon atmosphere, and maintained at a temperature of 900° C. for 6 hours, so that the rare earth compound diffused into the magnet and an infiltration reaction was performed. After the diffusion treatment, a diffusion layer was removed from the surface, and then stress-relief heat treatment was performed at a temperature of 900° C. for 10 hours, followed by final heat treatment at a temperature of 500° C. for 2 hours.

Also, after completion of the diffusion treatment, the diffusion treatment was performed under the same conditions again by using the Nd-Hydride compound as a coating material, to thereby manufacture a final specimen.

Table 3 shows an evaluation result of magnetic characteristics of magnets that were manufactured by manufacturing a sintered body composed of 31 wt % Nd-1 wt % B-2 wt % TM-Bal. wt % Fe (M=Cu, Al, Nb, Co), performing a first grain boundary diffusion using the Ho-Hydride, Dy-Hydride, and Tb-Hydride compounds as coating materials, and then performing a second grain boundary diffusion using the Nd-Hydride compound.

TABLE 3

| Sample | First diffusion | | Second diffusion | | Temperature characteristics | |
|---|---|---|---|---|---|---|
| | | | | | Br reduction ratio | Hcj reduction ratio |
| manufacturing conditions | Coating material | Coating amount (wt %) | Coating material | Coating amount (wt %) | according to temperature (%/° C.) | according to temperature (%/° C.) |
| Comparative Example 1-2 | Ho-Hydride | 1.0 | x | x | −0.13 | −0.65 |
| Comparative Example 1-3 | Dy-Hydride | 1.0 | x | x | −0.12 | −0.58 |
| Comparative Example 1-4 | Tb-Hydride | 1.0 | x | x | −0.11 | −0.52 |
| Example 3-1 | Ho-Hydride | 1.0 | Nd-Hydride | 0.5 | −0.13 | −0.55 |
| Example 3-2 | Dy-Hydride | 1.0 | Nd-Hydride | 0.5 | −0.12 | −0.51 |
| Example 3-3 | Tb-Hydride | 1.0 | Nd-Hydride | 0.5 | −0.11 | −0.45 |

Referring to Table 3, it may be confirmed that in the case of Comparative Example 1-2, when the Ho hydride diffused only once, the Br reduction ratio according to temperature was −0.13 (%/° C.) and the Hcj reduction ratio according to temperature was −0.65 (%/° C.), whereas in the case of Example 3-1, when the Ho hydride firstly diffused and then the Nd hydride secondarily diffused, the Br reduction ratio according to temperature had the same performance level of −0.13 (%/° C.) and the Hcj reduction ratio was improved to −0.55 (%/° C.). That is, it may be confirmed that a repetitive diffusion process using different coating materials may improve magnetic characteristics.

Example 4

An alloy composed of X wt % RE-Y wt % B-Z wt % TM-Bal. wt % Fe (wherein, RE=rare-earth element, TM=3d transition element, X=28-35, Y=0.5-1.5, Z=0-15) was melted in an argon atmosphere by an induction heating method and then rapidly cooled by using a strip casting method to thereby manufacture an alloy strip.

In the process of coarsely pulverizing the manufactured alloy strip, the strip was charged into a vacuum furnace, vacuum-exhausted, and then maintained in a hydrogen atmosphere for at least 2 hours, to allow hydrogen to be absorbed into the strip. Subsequently, the strip was heated to 600° C. in a vacuum atmosphere to thereby remove hydrogen present inside the strip. The coarsely pulverized and hydrotreated powder was used to manufacture a uniform and fine powder having an average particle diameter of 1-5.0 μm by a pulverization method using a jet mill technique. At this time, the process of manufacturing the alloy strip into fine powder was performed in a nitrogen or inert gas atmosphere in order to prevent the deterioration of magnetic characteristics due to contamination of oxygen.

The fine rare earth powder which had been pulverized by the jet mill was used to perform pressing in a magnetic field as follows. A mold was filled with the rare earth powder in a nitrogen atmosphere, and the rare earth powder was aligned in a uniaxial direction by applying a direct current magnetic field by electromagnets positioned to the right and left of the mold and was compression-molded by applying pressure of upper and lower punches simultaneously, to thereby manufacture a molded body. The molded body obtained by the pressing in a magnetic field was charged into a sintering furnace and sufficiently maintained in a vacuum atmosphere and at a temperature of 400° C. or less to completely remove residual impure organic materials, and the temperature was raised to 1,050° C. and maintained for 2 hours to perform a sintering densification process.

After the sintered body was manufactured by the above sintering manufacturing process, the sintered body was processed into a magnet having a size of 12.5×12.5×5 mm, and then the following grain boundary diffusion process was performed to improve high-temperature magnetic characteristics. After the processed magnet was immersed in an alkaline degreasing agent solution, the processed magnet was rubbed with a ceramic ball having a size of 2-10 pi to remove any oil constituent on a surface of the magnet, the magnet was washed clean with distilled water several times, and thus the residual degreasing agent was completely removed.

In order to uniformly apply a rare earth compound to the surface of the washed processed body, the rare earth compound was prepared by mixing Ho-Hydride and Dy-Hydride powders at a weight ratio of 50%:50%. Also, the rare earth compound obtained by mixing two different types of the powders and an alcohol were adjusted to a ratio of 50%:50% and uniformly mulled, to thereby prepare a heterogeneous rare earth compound slurry. Then, while the prepared slurry was put into a beaker and dispersed uniformly by using an ultrasonic cleaner, the processed body was immersed therein and maintained for 1 minute to 2 minutes, such that the rare earth compound was uniformly coated on the surface of the magnet.

In order to diffuse the coated rare earth compound into a crystal grain boundary inside the magnet, the coated body was charged into a heating furnace, heated at a heating rate of 1° C./min in an argon atmosphere, and maintained at a temperature of 900° C. for 6 hours, so that the rare earth compound diffused into the magnet and an infiltration reaction was performed. After the diffusion treatment, a diffusion layer was removed from the surface, stress-relief heat treatment was performed at a temperature of 900° C. for 10 hours, and then final heat treatment was performed at a temperature of 500° C. for 2 hours, to thereby manufacture a final specimen.

Table 4 shows an evaluation result of magnetic characteristics of magnets that were manufactured by manufacturing a sintered body composed of 31 wt % Nd-1 wt % B-2 wt % TM-Bal. wt % Fe (M=Cu, Al, Nb, Co), mixing the Ho-Hydride and Dy-Hydride compounds as coating materials at a ratio of 50%:50%, and then performing grain boundary diffusion.

TABLE 4

| Sample | Diffusion | | Room temperature magnetic characteristics | |
|---|---|---|---|---|
| manufacturing conditions | Coating material | Coating amount (wt %) | Residual magnetic flux density, Br (kG) | Coercivity, Hcj (kOe) |
| Comparative Example 1-2 | Ho-Hydride | 1.0 | 13.7 | 15.9 |
| Comparative Example 1-3 | Dy-Hydride | 1.0 | 13.6 | 21.5 |
| Example 4-1 | Ho-Hydride:Dy-Hydride = 50 wt %:50 wt % | 1.03% | 13.90 | 18.06 |
| Example 4-2 | Ho-Hydride:Dy-Hydride = 50 wt %:50 wt % | 1.20% | 13.95 | 18.33 |
| Example 4-3 | Ho-Hydride:Dy-Hydride = 50 wt %:50 wt % | 1.31% | 13.91 | 18.42 |
| Example 4-4 | Ho-Hydride:Dy-Hydride = 50 wt %:50 wt % | 1.43% | 13.91 | 18.52 |
| Example 4-5 | Ho-Hydride:Dy-Hydride = 50 wt %:50 wt % | 1.55% | 13.66 | 19.01 |
| Example 4-6 | Ho-Hydride:Dy-Hydride = 50 wt %:50 wt % | 1.79% | 13.74 | 18.80 |
| Example 4-7 | Ho-Hydride:Dy-Hydride = 50 wt %:50 wt % | 1.81% | 13.71 | 19.05 |
| Example 4-8 | Ho-Hydride:Dy-Hydride = 50 wt %:50 wt % | 1.95% | 13.66 | 19.26 |
| Example 4-9 | Ho-Hydride:Dy-Hydride = 50 wt %:50 wt % | 2.13% | 13.58 | 19.50 |
| Example 4-10 | Ho-Hydride:Dy-Hydride = 50 wt %:50 wt % | 2.28% | 13.54 | 19.52 |
| Example 4-11 | Ho-Hydride:Dy-Hydride = 50 wt %:50 wt % | 2.46% | 13.48 | 19.57 |
| Example 4-12 | Ho-Hydride:Dy-Hydride = 50 wt %:50 wt % | 2.65% | 13.56 | 19.61 |
| Example 4-13 | Ho-Hydride:Dy-Hydride = 50 wt %:50 wt % | 2.88% | 13.33 | 19.94 |
| Example 4-14 | Ho-Hydride:Dy-Hydride = 50 wt %:50 wt % | 2.98% | 13.43 | 20.01 |

Referring to Table 4, it may be confirmed that in the case of Comparative Example 1-3, only Dy-Hydride was used such that the residual magnetic flux density (Br) was 13.6 (kG) and the coercivity was 21.5 (kOe), whereas in the case of Example 4-5, the residual magnetic flux density (Br) was 13.66 (kG) and the coercivity was 19.01 (kOe). That is, it may be confirmed that in the case of Example 4-5, only 50% of Dy-Hydride was used to reduce manufacturing costs while the performance was comparable to that of the case where 100% of Dy-Hydride was used. Also, it may be confirmed that in the case of Example 4-14, the residual magnetic flux density (Br) was 13.43 (kG) and the coercivity was 20.01 (kOe), and thus the performance was almost comparable to that of Comparative Example 1-3.

Example 5

An alloy composed of X wt % RE-Y wt % B-Z wt % TM-Bal. wt % Fe (wherein, RE=rare-earth element, TM=3d transition element, X=28-35, Y=0.5-1.5, Z=0-15) was melted in an argon atmosphere by an induction heating method and then rapidly cooled by using a strip casting method to thereby manufacture an alloy strip.

In the process of coarsely pulverizing the manufactured alloy strip, the strip was charged into a vacuum furnace, vacuum-exhausted, and then maintained in a hydrogen atmosphere for at least 2 hours, to allow hydrogen to be absorbed into the strip. Subsequently, the strip was heated to 600° C. in a vacuum atmosphere to thereby remove hydrogen present inside the strip. The coarsely pulverized and hydrotreated powder was used to manufacture a uniform and fine powder having an average particle diameter of 1-5.0 μm by a pulverization method using a jet mill technique. At this time, the process of manufacturing the alloy strip into fine powder was performed in a nitrogen or inert gas atmosphere in order to prevent the deterioration of magnetic characteristics due to contamination of oxygen.

The fine rare earth powder which had been pulverized by the jet mill was used to perform pressing in a magnetic field as follows. A mold was filled with the rare earth powder in a nitrogen atmosphere, and the rare earth powder was aligned in a uniaxial direction by applying a direct current magnetic field by electromagnets positioned to the right and left of the mold and was compression-molded by applying pressure of upper and lower punches simultaneously, to thereby manufacture a molded body. The molded body obtained by the pressing in a magnetic field was charged into a sintering furnace and sufficiently maintained in a vacuum atmosphere and at a temperature of 400° C. or less to completely remove residual impure organic materials, and the temperature was raised to 1,050° C. and maintained for 2 hours to perform a sintering densification process.

After the sintered body was manufactured by the above sintering manufacturing process, the sintered body was processed into a magnet having a size of 12.5×12.5×5 mm, and then the following grain boundary diffusion process was performed to improve high-temperature magnetic characteristics. After the processed magnet was immersed in an alkaline degreasing agent solution, the processed magnet was rubbed with a ceramic ball having a size of 2-10 pi to remove any oil constituent on a surface of the magnet, the magnet was washed clean with distilled water several times, and thus the residual degreasing agent was completely removed.

In order to uniformly apply a rare earth compound to the surface of the washed processed body, the rare earth compound was prepared by mixing Nd-Hydride and Dy-Hydride powders at a weight ratio of 50%:50%. Also, the rare earth compound obtained by mixing two different types of the powders and an alcohol were adjusted to a ratio of 50%:50% and uniformly mulled, to thereby prepare a heterogeneous rare earth compound slurry. While the prepared slurry was put into a beaker and dispersed uniformly by using an ultrasonic cleaner, the processed body was immersed therein and maintained for 1 minute to 2 minutes, such that the rare earth compound was uniformly coated on the surface of the magnet.

In order to diffuse the coated rare earth compound into a crystal grain boundary inside the magnet, the coated body was charged into a heating furnace, heated at a heating rate of 1° C./min in an argon atmosphere, and maintained at a temperature of 900° C. for 6 hours, so that the rare earth compound diffused into the magnet and an infiltration reaction was performed. After the diffusion treatment, a diffusion layer was removed from the surface, stress-relief heat treatment was performed at a temperature of 900° C. for 10 hours, and then final heat treatment was performed at a temperature of 500° C. for 2 hours, to thereby manufacture a final specimen.

Table 5 shows an evaluation result of magnetic characteristics of magnets that were manufactured by manufacturing a sintered body composed of 31 wt % Nd-1 wt % B-2 wt % TM-Bal. wt % Fe (M=Cu, Al, Nb, Co), mixing the Nd-Hydride and Dy-Hydride compounds as coating materials at a ratio of 50%:50%, and then performing grain boundary diffusion.

TABLE 5

| Sample | Diffusion | | Room temperature magnetic characteristics | |
|---|---|---|---|---|
| manufacturing conditions | Coating material | Coating amount (wt %) | Residual magnetic flux density, Br (kG) | Coercivity, Hcj (kOe) |
| Comparative Example 1-1 | Nd-Hydride | 1.0 | 13.8 | 15.2 |
| Comparative Example 1-3 | Dy-Hydride | 1.0 | 13.6 | 21.5 |
| Example 5-1 | Nd-Hydride:Dy-Hydride = 50 wt %:50 wt % | 0.28% | 14.28 | 17.61 |
| Example 5-2 | Nd-Hydride:Dy-Hydride = 50 wt %:50 wt % | 0.64% | 14.16 | 18.88 |
| Example 5-3 | Nd-Hydride:Dy-Hydride = 50 wt %:50 wt % | 0.87% | 14.04 | 19.87 |
| Example 5-4 | Nd-Hydride:Dy-Hydride = 50 wt %:50 wt % | 1.03% | 13.96 | 20.33 |
| Example 5-5 | Nd-Hydride:Dy-Hydride = 50 wt %:50 wt % | 1.24% | 13.96 | 20.73 |
| Example 5-6 | Nd-Hydride:Dy-Hydride = 50 wt %:50 wt % | 1.46% | 14.10 | 20.20 |
| Example 5-7 | Nd-Hydride:Dy-Hydride = 50 wt %:50 wt % | 1.63% | 13.95 | 20.30 |
| Example 5-8 | Nd-Hydride:Dy-Hydride = 50 wt %:50 wt % | 1.83% | 14.00 | 20.58 |
| Example 5-9 | Nd-Hydride:Dy-Hydride = 50 wt %:50 wt % | 1.95% | 13.90 | 21.03 |
| Example 5-10 | Nd-Hydride:Dy-Hydride = 50 wt %:50 wt % | 2.03% | 14.06 | 20.16 |
| Example 5-11 | Nd-Hydride:Dy-Hydride = 50 wt %:50 wt % | 2.27% | 13.95 | 20.34 |
| Example 5-12 | Nd-Hydride:Dy-Hydride = 50 wt %:50 wt % | 2.37% | 14.08 | 20.38 |
| Example 5-13 | Nd-Hydride:Dy-Hydride = 50 wt %:50 wt % | 2.44% | 14.08 | 20.43 |
| Example 5-14 | Nd-Hydride:Dy-Hydride = 50 wt %:50 wt % | 2.72% | 13.90 | 20.68 |
| Example 5-15 | Nd-Hydride:Dy-Hydride = 50 wt %:50 wt % | 2.90% | 13.92 | 21.17 |
| Example 5-16 | Nd-Hydride:Dy-Hydride = 50 wt %:50 wt % | 3.06% | 13.98 | 20.35 |

Referring to Table 5, it may be confirmed that in the case of Comparative Example 1-3, only Dy-Hydride was used such that the residual magnetic flux density (Br) was 13.6 (kG) and the coercivity was 21.5 (kOe), whereas in the case of Example 5-4, the residual magnetic flux density (Br) was 13.96 (kG) and the coercivity was 20.33 (kOe). That is, it may be confirmed that in the case of Example 5-4, even when only 50% of Dy-Hydride was used, the performance was comparable to that of the case where 100% of Dy-Hydride was used. Also, it may be confirmed that in the case of Example 5-16, the residual magnetic flux density (Br) was 13.98 (kG) and the coercivity was 20.35 (kOe), and thus the performance was almost comparable to that of Comparative Example 1-3.

Example 6

An alloy composed of X wt % RE-Y wt % B-Z wt % TM-Bal. wt % Fe (wherein, RE=rare-earth element, TM=3d transition element, X=28-35, Y=0.5-1.5, Z=0-15) was melted in an argon atmosphere by an induction heating method and then rapidly cooled by using a strip casting method, to thereby manufacture an alloy strip.

In the process of coarsely pulverizing the manufactured alloy strip, the strip was charged into a vacuum furnace, vacuum-exhausted, and then maintained in a hydrogen atmosphere for at least 2 hours, to allow hydrogen to be absorbed into the strip. Subsequently, the strip was heated to 600° C. in a vacuum atmosphere to thereby remove hydrogen present inside the strip. The coarsely pulverized and hydrotreated powder was used to manufacture a uniform and fine powder having an average particle diameter of 1-5.0 μm by a pulverization method using a jet mill technique. At this time, the process of manufacturing the alloy strip into fine powder was performed in a nitrogen or inert gas atmosphere in order to prevent the deterioration of magnetic characteristics due to contamination of oxygen.

The fine rare earth powder which had been pulverized by the jet mill was used to perform pressing in a magnetic field as follows. A mold was filled with the rare earth powder in a nitrogen atmosphere, and the rare earth powder was aligned in a uniaxial direction by applying a direct current magnetic field by electromagnets positioned to the right and left of the mold and was compression-molded by applying pressure of upper and lower punches simultaneously, to thereby manufacture a molded body. The molded body obtained by the pressing in a magnetic field was charged into a sintering furnace and sufficiently maintained in a vacuum atmosphere and at a temperature of 400° C. or less to completely remove residual impure organic materials, and the temperature was raised to 1,050° C. and maintained for 2 hours to perform a sintering densification process.

After the sintered body was manufactured by the above sintering manufacturing process, the sintered body was processed into a magnet having a size of 12.5×12.5×5 mm, and then the following grain boundary diffusion process was performed to improve high-temperature magnetic characteristics. After the processed magnet was immersed in an alkaline degreasing agent solution, the processed magnet was rubbed with a ceramic ball having a size of 2-10 pi to remove any oil constituent on a surface of the magnet, the magnet was washed clean with distilled water several times, and thus the residual degreasing agent was completely removed.

In order to uniformly apply a rare earth compound to the surface of the washed processed body, the rare earth compound was prepared by mixing Ho-Hydride and Dy-Hydride powders at a weight ratio of 75%:25%. Also, the rare earth compound obtained by mixing two different types of the powders and an alcohol were adjusted to a ratio of 50%:50% and uniformly mulled, to thereby prepare a heterogeneous rare earth compound slurry. Then, while the prepared slurry was put into a beaker and dispersed uniformly by using an ultrasonic cleaner, the processed body was immersed therein and maintained for 1 minute to 2 minutes, such that the rare earth compound was uniformly coated on the surface of the magnet.

In order to diffuse the coated rare earth compound into a crystal grain boundary inside the magnet, the coated body was charged into a heating furnace, heated at a heating rate of 1° C./min in an argon atmosphere, and maintained at a temperature of 900° C. for 6 hours, so that the rare earth compound diffused into the magnet and an infiltration reaction was performed. After the diffusion treatment, a diffusion layer was removed from the surface, stress-relief heat treatment was performed at a temperature of 900° C. for 10 hours, and then final heat treatment was performed at a temperature of 500° C. for 2 hours, to thereby manufacture a final specimen.

Table 6 shows an evaluation result of magnetic characteristics of magnets that were manufactured by manufacturing a sintered body composed of 31 wt % Nd-1 wt % B-2 wt % TM-Bal. wt % Fe (M=Cu, Al, Nb, Co), mixing the Ho-Hydride and Dy-Hydride compounds as coating materials at a ratio of 50%:50%, and then performing grain boundary diffusion.

TABLE 6

| Sample | Diffusion | | Room temperature magnetic characteristics | |
|---|---|---|---|---|
| manufacturing conditions | Coating material | Coating amount (wt %) | Residual magnetic flux density, Br (kG) | Coercivity, Hcj (kOe) |
| Comparative Example 1-2 | Ho-Hydride | 1.0 | 13.7 | 15.9 |
| Comparative Example 1-3 | Dy-Hydride | 1.0 | 13.6 | 21.5 |
| Example 6-1 | Ho-Hydride:Dy-Hydride = 75 wt %:25 wt % | 0.79% | 14.19 | 15.60 |
| Example 6-2 | Ho-Hydride:Dy-Hydride = 75 wt %:25 wt % | 0.78% | 14.07 | 15.79 |
| Example 6-3 | Ho-Hydride:Dy-Hydride = 75 wt %:25 wt % | 1.20% | 13.98 | 16.13 |
| Example 6-4 | Ho-Hydride:Dy-Hydride = 75 wt %:25 wt % | 1.24% | 13.92 | 16.19 |
| Example 6-5 | Ho-Hydride:Dy-Hydride = 75 wt %:25 wt % | 1.54% | 13.82 | 16.57 |
| Example 6-6 | Ho-Hydride:Dy-Hydride = 75 wt %:25 wt % | 1.74% | 13.87 | 16.53 |

Referring to FIG. 6, it may be confirmed that in the cases of Examples 6-1 to 6-6, the coercivities were lower than those of Examples of Table 5. That is, it may be confirmed that the coercivities were not significantly improved compared to those of Example 5 because an amount of Ho-Hydride was greater than an amount of Dy-Hydride by a factor of three. FIG. 10 is a graph of a variation in residual magnetic flux density (Br) according to a coating amount, and FIG. 11 is a graph of a variation in coercivity (Hcj) according to a coating amount.

Referring to FIG. 10, compared to the case where only Dy-Hydride was used, when Dy-Hydride and Nd-Hydride were mixed, the residual magnetic flux density (Br) increased in some sections. Also, referring to FIG. 11, compared to the case where only Dy-Hydride was used, when Dy-Hydride and Nd-Hydride were mixed, the coercivity (Hcj) had a similar performance level.

Although embodiments have been mainly described hereinbefore, these are just examples and do not limit the present invention. In addition, the present invention may be changed and modified in various ways, without departing from the essential features of the present invention, by those skilled in the art. For example, the components described in detail in the embodiments of the present invention may be modified. Also, differences due to the modification and application should be construed as being included in the scope and spirit of the present invention, which is described in the accompanying claims.

The invention claimed is:

1. A method of manufacturing a rare-earth magnet, the method comprising:

preparing a magnetic sintered body including RE, Fe, and B as compositional components, wherein RE is selected from one or two or more selected from among rare earth elements;

applying a first solution containing a first grain boundary diffusion material to the magnetic sintered body;

performing a first grain boundary diffusion by heat-treating the magnetic sintered body;

applying a second solution containing a second grain boundary diffusion material to the magnetic sintered body; and performing a second grain boundary diffusion by heat-treating the magnetic sintered body, wherein the second grain boundary diffusion is performed after the first grain boundary diffusion is performed, wherein the first grain boundary diffusion material comprises a heavy rare earth element (HREE) hydride, wherein the second grain boundary diffusion material comprises a light rare earth element (LREE) hydride, wherein the heavy rare earth element (HREE) hydride comprises at least one of Dy hydride, Tb hydride, or Ho hydride, wherein the light rare earth element (LREE) hydride comprises Nd hydride, wherein a coating amount of the first grain boundary diffusion material is different from a coating amount of the second grain boundary diffusion material, wherein the first grain boundary diffusion material is a heavy rare earth element (HREE) hydride, and an amount of the first grain boundary diffusion material is 0.1 parts by weight to 1.0 part by weight based on the total weight of 100 parts by weight of the rare-earth magnet, wherein the second grain boundary diffusion material is a light rare earth element (LREE) hydride, and an amount of the second grain boundary diffusion material is 0.1 parts by weight to 0.5 parts by weight based on the total weight of 100 parts by weight of the rare-earth magnet, and wherein after performing the second grain boundary diffusion by heat-treating the magnetic sintered body, the light rare earth element (LREE) and the heavy rare earth element (HREE) remain in the magnetic sintered body.

2. The method of claim 1, wherein the applying of the first solution containing the first grain boundary diffusion material to the magnetic sintered body comprises:

preparing a rare earth compound slurry by mixing the first grain boundary diffusion material and an alcohol;

preparing a first solution by dispersing the rare earth compound slurry using an ultrasonic cleaner; and applying the first solution to a surface of the magnetic sintered body.

3. The method of claim 1, wherein the performing of the first grain boundary diffusion by heat-treating the magnetic sintered body comprises charging the magnetic sintered body coated with the first solution into a heating furnace, heating the magnetic sintered body so that a heating rate in an argon atmosphere is 0.1° C./min to 10° C./min, and then maintaining the magnetic sintered body at a temperature of 700° C. to 1,000° C. for 4 hours to 8 hours.

4. The method of claim 3, further comprising, after the performing of the first grain boundary diffusion by heat-treating the magnetic sintered body, removing stress by performing heat-treatment within a temperature range of 400° C. to 1,000° C.

5. The method of claim 1, wherein the applying of the second solution containing the second grain boundary diffusion material to the magnetic sintered body comprises:

preparing a rare earth compound slurry by mixing the second grain boundary diffusion material and an alcohol;

preparing a second solution by dispersing the rare earth compound slurry using an ultrasonic cleaner; and applying the second solution to a surface of the magnetic sintered body.

6. The method of claim 1, wherein the performing of the second grain boundary diffusion by heat-treating the magnetic sintered body comprises charging the magnetic sintered body coated with the second solution into a heating furnace, heating the magnetic sintered body so that a heating rate in an argon atmosphere is 0.1° C./min to 10° C./min, and then maintaining the magnetic sintered body at a temperature of 700° C. to 1,000° C. for 4 hours to 8 hours.

7. The method of claim 6, further comprising, after the performing of the second grain boundary diffusion by heat-treating the magnetic sintered body, removing stress by performing heat-treatment within a temperature range of 400° C. to 1,000° C.

* * * * *